Patented Sept. 12, 1922.

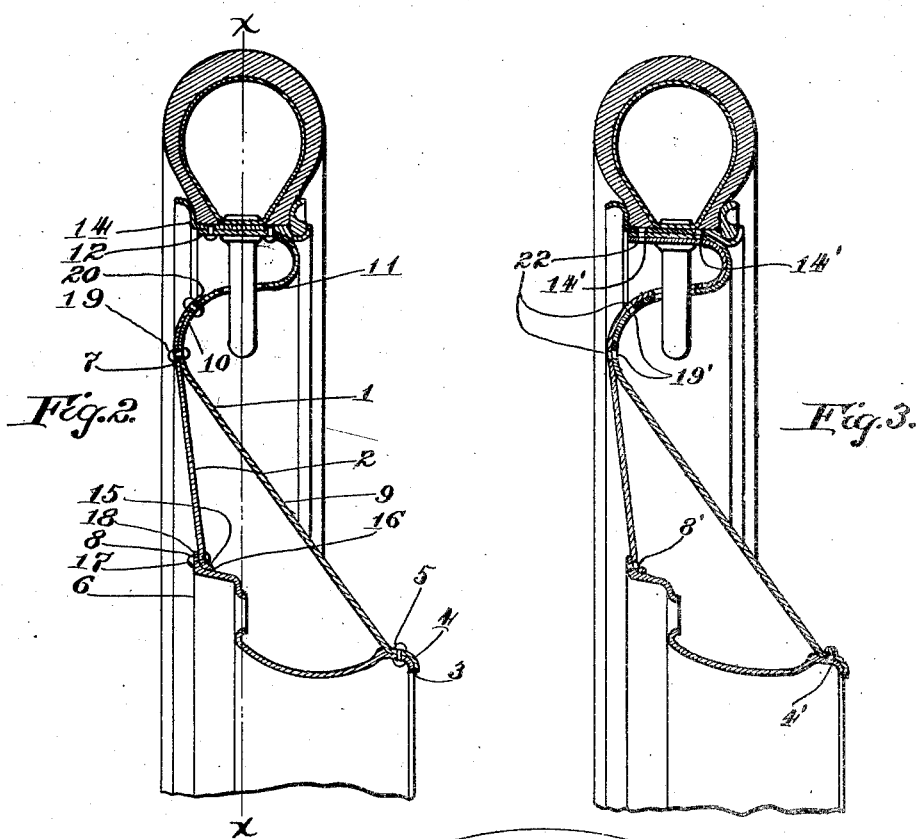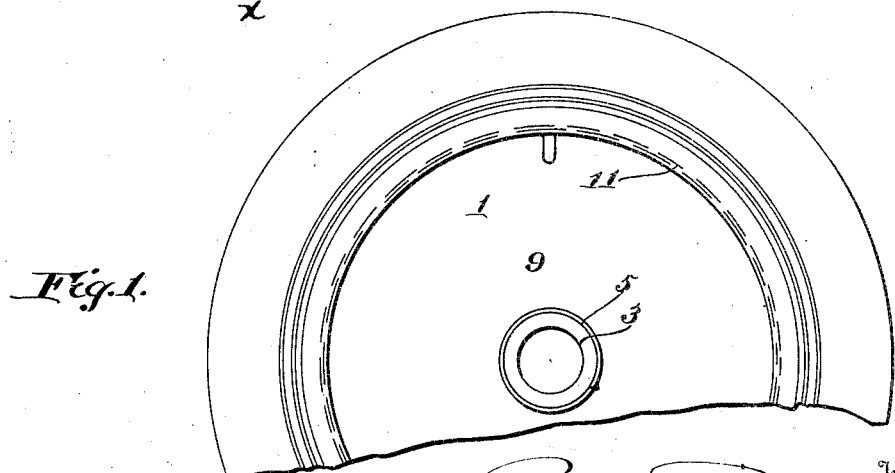

1,428,742

UNITED STATES PATENT OFFICE.

ROBERT P. ALLISON, OF RICHMOND, VIRGINIA.

DISK WHEEL.

Original application filed February 3, 1919, Serial No. 274,719. Divided and this application filed October 8, 1921. Serial No. 506,226.

*To all whom it may concern:*

Be it known that I, ROBERT P. ALLISON, a citizen of the United States of America, residing in the city of Richmond, in the county of Henrico, State of Virginia, have invented certain new and useful Improvements in Disk Wheels, of which the following is a specification.

This application is a division of my copending application—Serial No. 274,719, filed February 3, 1919.

The demand for motor vehicle wheels has reduced the available supply of second growth hickory available for this purpose, to such an extent that it is no longer sufficient, so that the quality of the wheels is deteriorating and the cost rapidly increasing. Wooden wheels, particularly those of the reduced quality now being made, are dangerous in that they are apt to collapse completely and instantaneously in response to unusual shocks, particularly those involving severe lateral stresses. The cost of wire wheels has largely increased and the product is not wholly satisfactory in that the spokes loosen with use and the wheels require more or less frequent readjustment.

Disk wheels have been used to some extent, but in the past have been found objectionable because of their extreme rigidity to lateral as well as radial stresses and their tendency to fail by crystallization.

The object of the present invention is to produce a sheet metal disk wheel for road vehicles with sufficient resiliency for satisfactory operation and protection of the wheel and vehicle structure, the resiliency being comparable to that of the ordinary wire or wooden wheel and in no wise related to that supposedly incident to so-called elastic wheels offered as a means for supplanting pneumatic tires. The present wheel is a substitute for an ordinary wire or wooden wheel. The important ends accomplished by the invention are the production of a wheel so designed as to prevent failure by crystallization by so arranging the material that it resists and at the same time is protected from harmful effects of the excessive lateral stresses adjacent the hub and is free from the rigidity which is usually a characteristic of such wheels. Another feature is that the wheel is so constructed as to provide easy access to the tire valve for inflating and deflating without loss of any appreciable amount of resistive capacity, that is, no considerable area of the disk is cut away to give access to the valve. The wheel of the invention is not only safe and reliable but almost indestructible, low in cost, of pleasing appearance and easy to keep clean.

In the wheel constructed in accordance with the preferred form of the invention, the principal part of the load is resisted by a cross-section of material presented by the horizontal cross-section through the axis, transmitting the load from the hub to the rim, the metal in this section acting in shear.

The curved peripheral portion or zone near the rim, while sufficiently strong to maintain the correct shape of the wheel under normal conditions, permits sufficient momentary distortion in any direction to distribute the shock and prevent undue stress at any particular point. Near the hub where the greatest moment arms occur and where all lateral stresses are concentrated in a small area, and where the most frequent failure results, provision has been made by arrangement of the metal for the presentation of maximum resistance. To this end, in addition to constructing the wheel so that it has a considerable amount of resiliency adjacent the rim, the material adjacent the hub is divided into two portions or plates which, though they meet and combine adjacent the resilient periphery, are secured to the hub at widely separated points of support. In other words, the stresses, particularly the lateral stresses are distributed in an elastic zone adjacent the rim and the material near the hub is preferably increased or reinforced to resist all stresses particularly those tending to cause lateral deflection, and, further, it is arranged to offer the most effective resistance to vibration of the metal, making crystallization impossible.

The central portions are preferably conic sections meeting and secured together at their bases near the resilient periphery and having their small diameters secured to the hub at the opposite ends.

The comparatively resilient peripheral zone in the preferred form of the invention includes a reverse curve, S-bend or peripheral corrugated portion having an intermediate connecting section which is practically cylindrical or parallel to the axis of the wheel or which crosses the central upright fore and aft plane of the wheel with an arcuate or otherwise curved area at one edge connected to the rim and another curved area at the other edge connected to the central area of the disk body extending inward to the hub. Adjacent the latter curve is a line of contact where two annular sections forming the inner portion of the disk meet and join, and from which they diverge toward the hub, the inner periphery of each being secured to the corresponding periphery of the hub, i. e., one toward the outer, the other inner axial end.

In the accompanying drawing I have illustrated a disk wheel embodying the various features of my invention, two slightly different forms being shown. In the drawings:

Figure 1 is a side elevation of the wheel, i. e., looking from the end of the axle toward the wheel;

Figure 2 is a radial section of one form of wheel, and

Figure 3 is a corresponding radial section of another form of slightly heavier construction.

Referring to the drawings by numerals, each of which is used to indicate the corresponding parts in the different figures, the structure illustrated, particularly in Figure 2, comprises a principal disk 1 and a reinforcing disk 2. The principal disk 1 preferably has a central aperture 3 at the circumference of which the material forming the disk is secured to the hub adjacent the outer end by suitable means, as riveting 4 or spot-welding, the parts being preferably further bound by an encircling band or ring 5, the details being merely selective.

From the circumference of the central aperture 3, the principal disk 1, as it extends outward radially, is inclined backward toward the radial plane of the inner end of the hub, i. e., toward the central portion of the vehicle, forming a frustum of a cone, the small circumference of which is engaged by the binding ring 5, the base or large circumference 7 being, in the instance illustrated, slightly beyond the plane of the inner face of the hub, or more properly the drum 6. From the large or base circumference 7 of the frustum or other inclined portion 9, tracing the plate outward toward the rim, the plate is swung in a curve 10 tending backward toward the radial plane of the opposite end of the hub, the latter curve being swung about a circular axis concentric with the axis of the wheel. Viewing the section shown in Figure 2 and following the intersection of the plane of this figure with the principal plate 1, it will be noted that this line passes from curve 10 through the central plane of the wheel and then swings in a reverse curve 11 about a second circular axis concentric with the wheel and on a relatively small radius into the peripheral or cylindrical plane 12 parallel to and in contact with the rim 14. This rim 14, secured to the peripheral, cylindrical portion 12 by riveting, spot-welding or in any other suitable manner, is of any convenient type which may be selected.

The secondary or reinforcing disk 2 is most conveniently apertured at 15 to accommodate the type of hub, and an edge flange 16 encircling the aperture is secured to the corresponding periphery of the hub by any suitable means as by riveting or spot-welding at 17 to a peripheral flange 18 on the hub, the details being merely selective, following the intersection of this plate with the plane of Figure 2, it extends toward the periphery of the wheel until it meets the base or large circumference of the incline or conic section 9 of the principal plate, at which point 7 it is shown in contact with the principal plate and to which it is preferably fastened in any convenient manner as by riveting or spot-welding at 19.

In the lighter form of wheel shown in Figure 2, the reinforcing or secondary plate 2 terminates in a circumference 20 in or near the curve 10, or is otherwise suitably spaced inward from the periphery of the principal plate 1, leaving a considerable curved section of the plate 1 of reduced thickness between the outer periphery of the plate 2 and the rim whereby comparatively greater resiliency is secured.

Figure 3 shows the heavier type of wheel in which the plates 1 and 2 are co-extensive, parallel in contact and preferably secured together throughout the curved peripheral section or zone 22.

It will be noted that in Figure 3 I have substituted for the riveted fastenings 4, 8, 19 and 29, spot-welding 4', 8', 29', and 19', respectively, but this substitution has no reference to the other differences in structure, the question of riveting, spot-welding or other fastening means being purely one of selection.

Having reference to the foregoing description and drawings, it is pointed out that the sheet metal disk structure described consists of primary and secondary or principal and reinforcing plates, both secured to the periphery of the hub, one adjacent the outer and the other adjacent the inner end, from which ends they are led to a circle of contact adjacent the plane of the inner face of the rim where they are joined, extending outward from this circle of contact through a zone formed in corrugations concentric with the wheel. Preferably the reinforced portion is inclined to the central plane of rotation of the wheel and extends through it from a point on the hub spaced well on one side to the point of juncture of the two parts of the disk which is on the other side of the plane, and the corrugations or S-bend extend on both sides of said plane.

I have thus described specifically and in detail two slightly different forms of disk wheel or more correctly spoke disk illustrating the application of the various features of my invention. The specific description is supplied to make the nature and the manner of utilizing the invention clear and not for the purpose of limiting the scope of the protection which is sought.

What I claim and desire to secure by Letters Patent is:

1. Means for supporting the hub of a wheel on the rim consisting of a disk of sheet material having an outer portion formed in a reverse curve on substantially circular axes concentric with the wheel, and a central re-enforced portion consisting of a plurality of members diverging from a circumference adjacent said curve to points of juncture with the hub widely separated in the direction of the axis of the wheel.

2. Means for supporting the hub of a wheel consisting of sheet material having peripheral corrugated portions substantially concentric with the wheel and extending on each side of the central plane of rotation of the wheel, and diverging members extending inward from the corrugations and secured to the hub at points widely spaced in the direction of its axis.

3. Means for supporting the hub of a wheel consisting of sheet material having peripheral corrugated portions substantially concentric with the wheel and extending on each side of the central plane of rotation of the wheel, and diverging members extending inward from the corrugations and secured to the hub at points widely spaced in the direction of its axis, the diverging members being inclined at different angles but in the same general direction as related to the plane of rotation of the wheel, one said member having the greatest inclination extending from one end of the hub through the central plane of rotation to the base of the corrugated portion where it meets the other said diverging member, the corrugations extending substantially equal distances on each side of the central plane.

4. A sheet metal wheel disk consisting of a double frusto-conical central portion and a peripheral portion in the form of an S-bend.

5. A sheet metal wheel disk consisting of a frusto-conical central portion extending through the central plane of the tread and a peripheral portion in the form of a circularly extending corrugation between the planes of the large and small circumferences of said frustum.

6. A sheet metal wheel disk consisting of a frusto-conical central portion and a peripheral portion in the form of circularly extending corrugations between the planes of the base and peak circumferences of said frustum, the small circumference of said frustum being secured to the hub adjacent one end of the wheel axis, and reinforcing means radiating from the hub and spaced from said frustum, said reinforcing means meeting the frusto-conical portion adjacent the corrugations.

7. Means for supporting a wheel hub on the rim, consisting of sheet material secured to the hub near one axial end extending outward toward the rim with an inclination backward toward the other end of the hub which carries it well through and past the central plane of the tread of the wheel, and a peripheral corrugated zone beyond and joined to said inclined portion between the planes of rotation of the extremes of said incline.

8. Means for supporting a wheel hub on the rim, consisting of sheet material secured to the hub near the one axial end extending outward toward the rim with an inclination backward toward the other end of the axis which carries it well through and past the central plane of the tread of the wheel, and a peripheral zone formed in a reverse curve beyond and joined to said inclined portion and located between the planes of rotation of the extremes of said incline.

9. Means for supporting a wheel hub on the rim, consisting of sheet material secured to the hub near one axial end extending outward toward the rim with an incline backward toward the other end of the axis which carries it well through and past the central plane of the tread of the wheel, and a peripheral corrugated zone beyond and joined to said incline portion between the planes of the extremes of said incline, said peripheral portion terminating in a cylindrical flange to be joined to the rim.

10. A spoke disk of sheet material having a deep corrugation near and substantially parallel to the rim and intersected by the central plane of the tread and an inner inclined portion secured to the hub.

11. A sheet metal wheel disk consisting of a peripheral portion in the form of an S bend and a frusto-conical central portion, the base of the conical portion joining the S bend, the central plane of rotation of the tread intersecting the frusto-conical portion and the S bend portion.

12. A spoke disk of sheet material formed with ridges parallel to and adjacent the outer periphery, and a central inclined portion joining the ridged periphery adjacent the peak of one of the ridges.

13. A spoke disk of sheet material having deep corrugations near and substantially parallel to the periphery, and a central reinforced portion secured to the hub, the corrugations and the reinforced portion being distributed with substantial equality on each side of the central plane of the tread.

Signed by me at Richmond, Virginia, this 6th day of October, 1921.

ROBERT P. ALLISON.

Witnesses:
H. G. STUART,
HUGH R. LEWIS.